US009681026B2

(12) United States Patent
Feng (10) Patent No.: US 9,681,026 B2
(45) Date of Patent: Jun. 13, 2017

(54) SYSTEM AND METHOD FOR LENS SHADING COMPENSATION

(71) Applicant: HTC CORPORATION, Taoyuan, Taoyuan County (TW)

(72) Inventor: Wen-Chun Feng, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 14/249,892

(22) Filed: Apr. 10, 2014

(65) Prior Publication Data

US 2014/0307129 A1  Oct. 16, 2014

Related U.S. Application Data

(60) Provisional application No. 61/812,066, filed on Apr. 15, 2013.

(51) Int. Cl.
| H04N 5/217 | (2011.01) |
| H04N 5/235 | (2006.01) |
| G06T 5/00 | (2006.01) |
| H04N 5/355 | (2011.01) |
| H04N 5/357 | (2011.01) |
| H04N 9/68 | (2006.01) |
| H04N 9/73 | (2006.01) |

(52) U.S. Cl.
CPC .......... *H04N 5/2173* (2013.01); *G06T 5/006* (2013.01); *H04N 5/2353* (2013.01); *H04N 5/2355* (2013.01); *H04N 5/3572* (2013.01); *H04N 5/35581* (2013.01); *H04N 9/68* (2013.01); *H04N 9/735* (2013.01)

(58) Field of Classification Search
CPC ........ H04N 5/2173; H04N 9/68; H04N 9/735; H04N 5/35581; H04N 5/3572; H04N 5/2353; H04N 5/2355; G06T 5/006
See application file for complete search history.

(56) References Cited

U.S. PATENT DOCUMENTS

| 8,319,861 B2* | 11/2012 | Chen ...................... H04N 5/165 348/243 |
| 2013/0002912 A1* | 1/2013 | Park et al. ..................... 348/251 |
| 2014/0152694 A1* | 6/2014 | Narasimha et al. ........... 345/629 |
| 2014/0192227 A1* | 7/2014 | Zhang et al. .............. 348/230.1 |

* cited by examiner

*Primary Examiner* — Padma Haliyur
(74) *Attorney, Agent, or Firm* — Muncy, Geissler, Olds & Lowe, P.C.

(57) ABSTRACT

A method for performing lens shading compensation is provided. The method includes: receiving at least two series of source images of different exposure settings; performing first lens shading compensation on the at least two series of source images respectively; analyzing luminance distribution of the at least two series of compensated source images; composing a series of HDR images from the at least two series of compensated source images according to the luminance distribution; performing second lens shading compensation on the series of HDR image; and performing tone mapping on the series of compensated HDR images. A system for performing lens shading compensation is also provided.

16 Claims, 6 Drawing Sheets

SYSTEM AND METHOD FOR LENS SHADING COMPENSATION

CROSS-REFERENCES TO RELATED APPLICATIONS

This application claims priority benefit of U.S. Provisional Patent Application Ser. No. 61/812,066, filed Apr. 15, 2013, which is hereby incorporated herein by reference in its entirety.

BACKGROUND OF THE INVENTION

Field of the Invention

The present invention relates to a system and a method for lens shading compensation.

Descriptions of the Related Art

Image capture and processing functions are widely implemented in consumer electronic devices, such as digital camera, smart phone or tablet. Images are generally captured by an input module comprising image sensors and lens. The raw images thus captured are performed with various processing before being provided for display and/or storage. Some processing may be general for all types of image capture operations, including photo shooting or video recording, for example de-noise that removes defect pixels. Some may be specific for desired functions/effects. For example, high dynamic range (HDR) is performed to produce images covering wider brightness range by combining two or more images captured by different exposure settings. While some other processing may aim to fix issues due to hardware limitations. Lens shading effect is a common problem caused by the inhibit limitation of camera lens. Due to the curve shape and limited angle of the lens surface, the intensity of incident light coming from the edges and corners and received by image sensors would be weaker than that in the middle of the lens and thus causes distortion on the color channels. This is called as lens shading effect. The impact of lens shading also varies for different color channels. For example, red color channel is affected more severely than blue and green color channels. To solve this problem, lens shading compensation is performed to restore the color values at the edges and corners.

SUMMARY OF THE INVENTION

An objective of the present invention is to provide a method for performing lens shading compensation, and the method comprises: receiving at least two series of source images of different exposure settings; performing first lens shading compensation on the at least two series of source images respectively; analyzing luminance distribution of the at least two series of compensated source images; composing a series of HDR images from the at least two series of compensated source images according to the luminance distribution; performing second lens shading compensation on the series of HDR image; and performing tone mapping on the series of compensated HDR mages.

Another objective of the present invention is to provide an image processing system, and the system comprises: an image analysis module, configured to receive at least two source images of different exposure settings and compute image statics of the at least two source images in parallel; an HDR composition module, configured to generate an HDR image from the at least two source images according to the image statics; and a lens shading compensation module, configured to perform lens shading compensation on the HDR image; wherein the at least two source images and the HDR image are processed in raw image domain.

A further objective of the present invention is to provide another method for performing lens shading compensation, comprising: receiving at least two source images of different exposure settings; analyzing image statics of the at least two source images; composing at least an HDR image from the at least two source images according to the image statics; and performing lens shading compensation on the HDR image; wherein the steps of analyzing image statics, composing the HDR image and performing lens shading compensation are executed in raw image domain.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

The present disclosure relates system and method of lens shading compensation in high dynamic range (HDR) image composition. To resolve lens shading effect, lens shading compensation is performed on source images used to generate the HDR images. In embodiments of the present disclosure, the image processing system may be implemented in an electronic device, such as portable phone, digital camera, tablet, multimedia devices, and/or other suitable portable device. The image processing system is capable to perform camera shooting and video recording in HDR. Please refer to FIG. 1, which illustrates an embodiment of the image processing system 100. The image processing system 100 comprises, among others, an image input unit 110, a pre-processing unit 120 and a post-processing unit 130. In one embodiment of the present disclosure, the image input unit 110 may comprise at least a lens module and an image sensor module for capturing source images. The image input unit 110 is capable to provide multiple source images of different exposure settings in parallel. Source images of different exposure settings may be provided in various ways. In an embodiment of the present disclosure, the image input unit 110 provides long exposure images and short exposure images in interleave. In another embodiment of the present disclosure, the image input unit 110 provides image frames interlaced with long exposure and short exposure lines. Yet in another embodiment of the present disclosure, the image input unit 110 provides long exposure frames and short exposure frames simultaneously in parallel.

Figure 1:
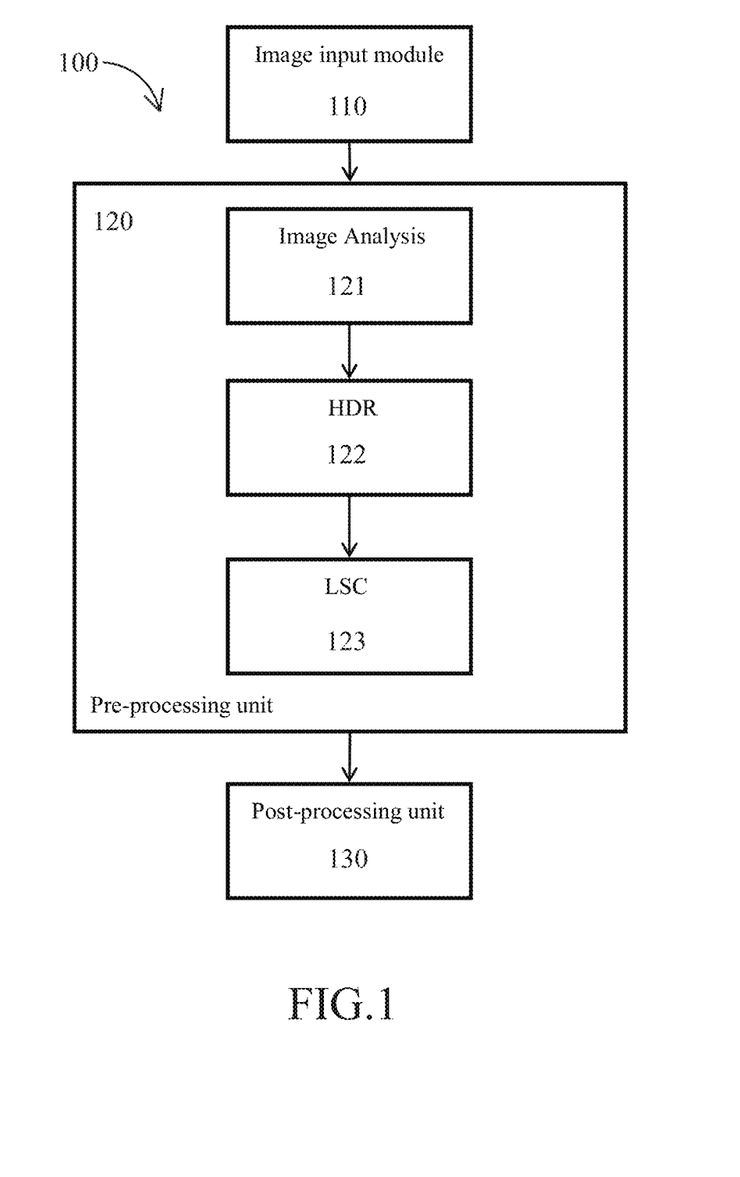
FIG. 1 is a schematic diagram of an embodiment of an image processing system of the present invention.

The pre-processing unit 120 is configured to, among other processing, receive source images from the image input unit 110, analyze the source images, and perform HDR composition and lens shading compensation. In an embodiment of the present disclosure, the pre-processing unit 120 receives and processes the source images in raw image domain and provides output HDR images in raw image domain as well. The pre-processing unit 120 comprises, among others, an image analysis module 121, an HDR composition module 122, a lens shading compensation module 123 and optionally a local lens shading compensation module 124. The image analysis module 121 is configured to perform various static analyses on the source images, such as focus state, sharpness, image histogram, etc. In an embodiment of the present disclosure, the image analysis module 121 may compute histograms of the color channels, for example R, G and B respectively. The color histogram represents distribution of pixel amounts with respect to color values. For each color channel, the color value may distribute from 0 to 255 for example, depending on the resolution/bit-rate of the image processing system. In another embodiment of the present disclosure, the image analysis module 121 may compute luminance and/or chrominance histogram of the source images. The luminance histogram of corresponding pair of source images may be referenced by the HDR composition module 122 for determining which source image should contribute to which part of the scene. Furthermore, the luminance distribution may be used to adjust exposure settings of the image input unit 110. For example, in the condition that the luminance distribution indicates a large portion of pixels of a source image of a first exposure setting fall below certain luminance threshold, the first exposure setting is adjusted to shift the luminance distribution toward higher value. To facilitate processing and emphasize on information user concerns most, the image analysis module 121 may only compute image histogram of a region of interest (RoI) of the source images. RoI may be a partial region within the source images, and the size and location of the RoI within the source images may be predetermined by system or determined by user or other algorithms. For example, the RoI may be determined according to the result of face detection since user might care about information of a person than other objects.

The HDR composition module 122 is configured to generate composite images from the source images according to the image statics provided by the image analysis module 121. The HDR image is composed by portions of the source images of different exposure settings according to the luminance distribution of the source images. For example, when the scene being captured comprises a bright object in a dark background, the HDR composition module 122 may combine the partial image of the bright object from source images having relative long exposure value with the partial image of the dark background from source images having relative short exposure value. The composite HDR image is then sent to the lens shading compensation module 123 for performing lens shading compensation. The lens shading compensation module 123 may apply suitable filters and/or algorithms on pixels of the HDR image to adjust the color value of pixels according to their positions. In an embodiment of the present disclosure, each color channel R, G and B is compensated separately with different compensation level. Processing and algorithms of HDR composition and lens shading compensation are known in the art and thus will be omitted here for simplicity. Please note that the composite HDR image or the compensated HDR image may be further analyzed to compute the overall luminance distribution, and exposure settings of the source images may be adjusted according to the overall luminance distribution. In another embodiment of the present disclosure, the exposure settings of the source images are adjusted according to the luminance distribution of the source images respectively.

The post-processing unit 130 is configured to receive the compensated HDR image and perform other processing on the compensated HDR image, such as de-noise, motion compensation, de-mosaic, etc. Among all, the post-processing unit 130 converts the compensated HDR image in raw image format to another image format, such as RGB format. The post-processing unit 130 then provides the converted HDR image to other units external to the image processing system for display, edit and/or storage, such as display unit and/or storage unit (not shown). In an embodiment of the present disclosure, the pre-processing unit 120 and the post-processing unit 130 may be implemented as separate hardware processors, such as a dedicated raw image processing chip and an image signal processor respectively. In another embodiment of the present disclosure, the pre-processing unit 120 and the post-processing unit 130 may be functional units within a single processors, each of the processing units may comprise functional-specific hardware in combination with software programs/codes.

Figure 2:
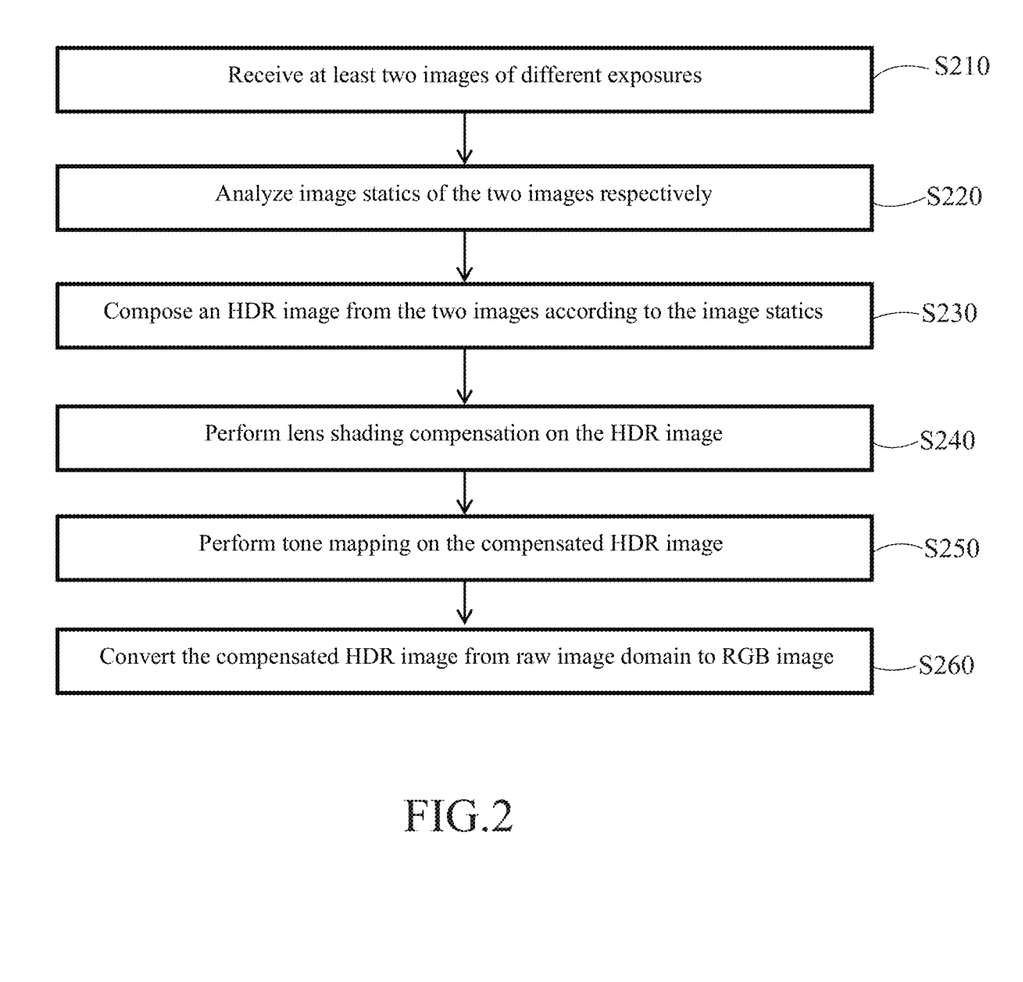
FIG. 2 is a flow chart of an embodiment of a lens shading compensation method of the present invention.

Please refer to FIG. 2, which illustrates an embodiment of lens shading compensation method for HDR composition of the present disclosure. The method can be implemented in the image processing system of FIG. 1 and be executed by the processing units of the image processing system. The image processing system can be an electronic device, such as mobile phone, tablet digital camera/camcorder, multimedia device, and/or other portable devices. The method starts with receiving at least two series of source images of different exposure settings (S210), for example a series of long exposure images and a series of short exposure images. The number of source images can be determined according to system limitation and/or user requirement. Then image statics of the two series of source images are analyzed respectively in S220. The image statics may comprise pixel distribution of color channels, luminance channel and/or chrominance channel. In an embodiment of the present disclosure, the image statics is analyzed only on partial region of the source images. The partial region is a region of interest determined by system, user designation or automatic detection. According to the image statics, a series of HDR image is composed from the series of source images in S230. The series of HDR image may be generated according to the luminance distribution of the source images, in which the series of image having relative long exposure contributes to the dark part of the scene and series of image having relative short exposure contributes to the bright part of the scene, for example. The series of composite HDR image next is processed by lens shading compensation in S240. The lens shading compensation is performed by adjusting value of the color channels according to the location of the pixels within the composite HDR image. The level of compensation is increased from center to the edges and corners in general and each color channel has different compensation degree. As described in the background, red color may need stronger compensation than blue channel and green channel. The actual compensation depends on characteristics of the lens module. For different lens module, the compensation level varies. Next the series of compensated HDR imaged is performed with tone mapping in S250 for smooth the overall presentation. Following above processing, in step S260 the series of compensated HDR image is converted from raw image domain to another image domain, such as RGB. Images in raw image domain cannot be used for display or editing directly to a user, therefore should be converted to another image domain visible to user. The converted images may also be converted again to other image domain for performing processing specific in that image domain, such as HSV domain. Please note that in the embodiment of FIG. 2, the HDR composition and the lens shading compensation are both performed in raw image domain, such as by the pre-processing unit 120 of FIG. 1.

Figure 3:
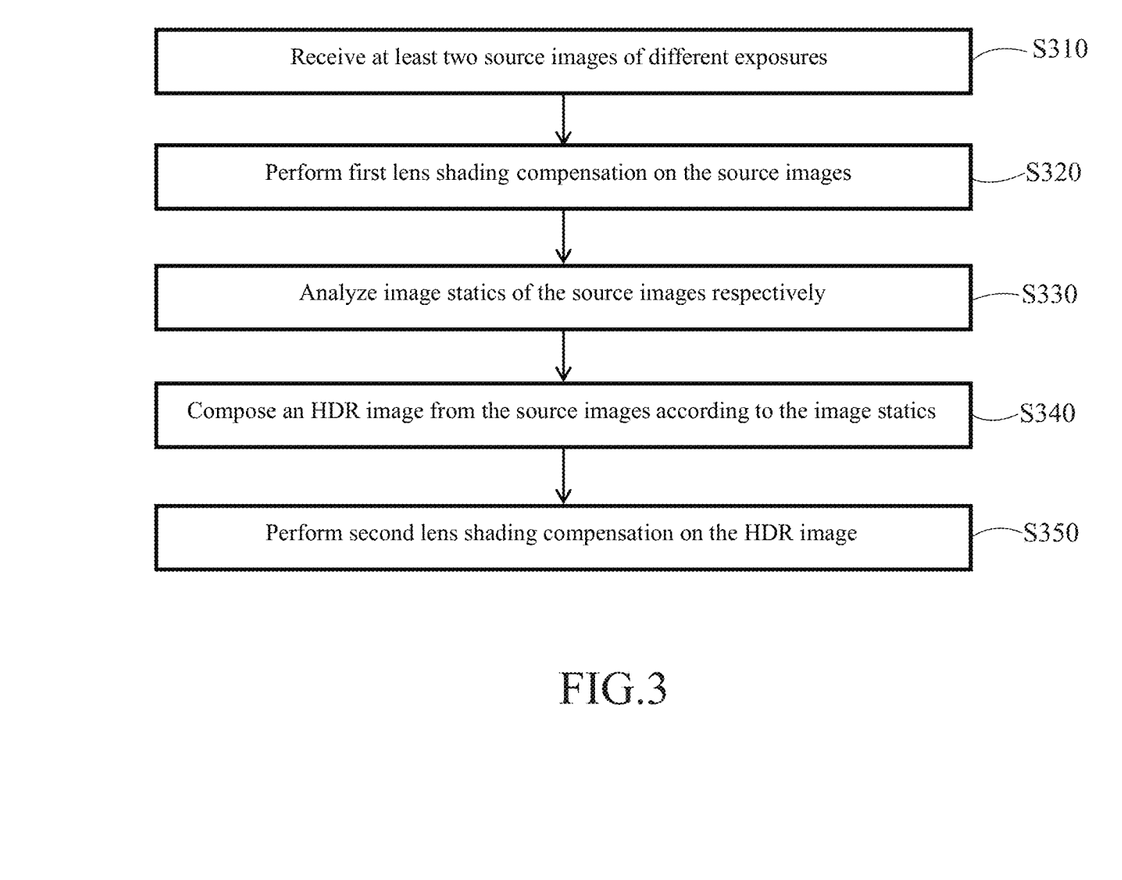
FIG. 3 is a flow chart of another embodiment of a lens shading compensation method of the present invention.

Next please refer to FIG. 3, which illustrates another embodiment of lens shading compensation method for HDR composition of the present disclosure. Similar to the embodiment of FIG. 2, the method of FIG. 3 can be implemented in an image processing system of FIG. 1 and be executed by the processing units of the image processing system. At least two series of source images of different exposure settings are captured and received in S310. The exposure setting comprises at least exposure time and exposure gain. When applying the lens compensation method for HDR composition in video recording, the exposure settings may be adjusted dynamically. The series of source images can be provides by different image sources and be processed by different image data paths of the image processing system. Please note here that the image sources and the image data paths need not be physically separated hardware components or circuits. The series of source images are first processed by performing a first lens shading compensation on at least one of the color channels as shown in S320. The first lens shading compensation may be implemented by applying shading factors on the series of source images. For each of the color channels, compensation levels of the shading factors may be set according to the pixel positions in the source images. Pixels at the edges or corners of the source images would have stronger compensation than pixels in the center or interior regions of the source images. In another embodiment of the present disclosure, the first shading compensation may be implemented by suitable filters and/or algorithm, however it might require more resource and time. The series of compensated source images are then analyzed to obtain corresponding image statics in S330, including but not limited to exposure, sharpness, focus state, and luminance histogram, etc. The luminance histograms of the series of compensated source images are used in the next step S340 for composing a series of HDR images. The HDR images are composed by combining partial regions of the source images and/or combining color values of corresponding pixels in the source images. That is, for a given pixel position in the composite HDR image, its pixel value may be derived from any combination of pixel values at the same pixel positions in the source images. The pixel value may be selected from one of the source images or be weighted average of the source images. However, different from the embodiment of FIG. 2, the HDR composition is performed based on the image statics of the compensated source images. Last, the series of composite HDR images undergo another lens shading compensation in S350. The purpose of performing a second lens shading compensation is to adjust the overall color statics. As said, the color values of the pixels might be contributed from different combination of the source images. The desired lens shading compensation of the color channels might be changed during the HDR composition. Therefore the composite HDR images are performed with lens shading compensation again to achieve desired color distribution. Also note here that the lens shading compensation and the HDR composition are performed in raw image domain, such as the pre-processing unit 120 of FIG. 1, and the shading compensation may be implemented by hardware or software. For example the shading compensation of the source images can be implemented by dedicated hardware while the shading compensation of the composite HDR image can be implemented by software.

Figure 4:
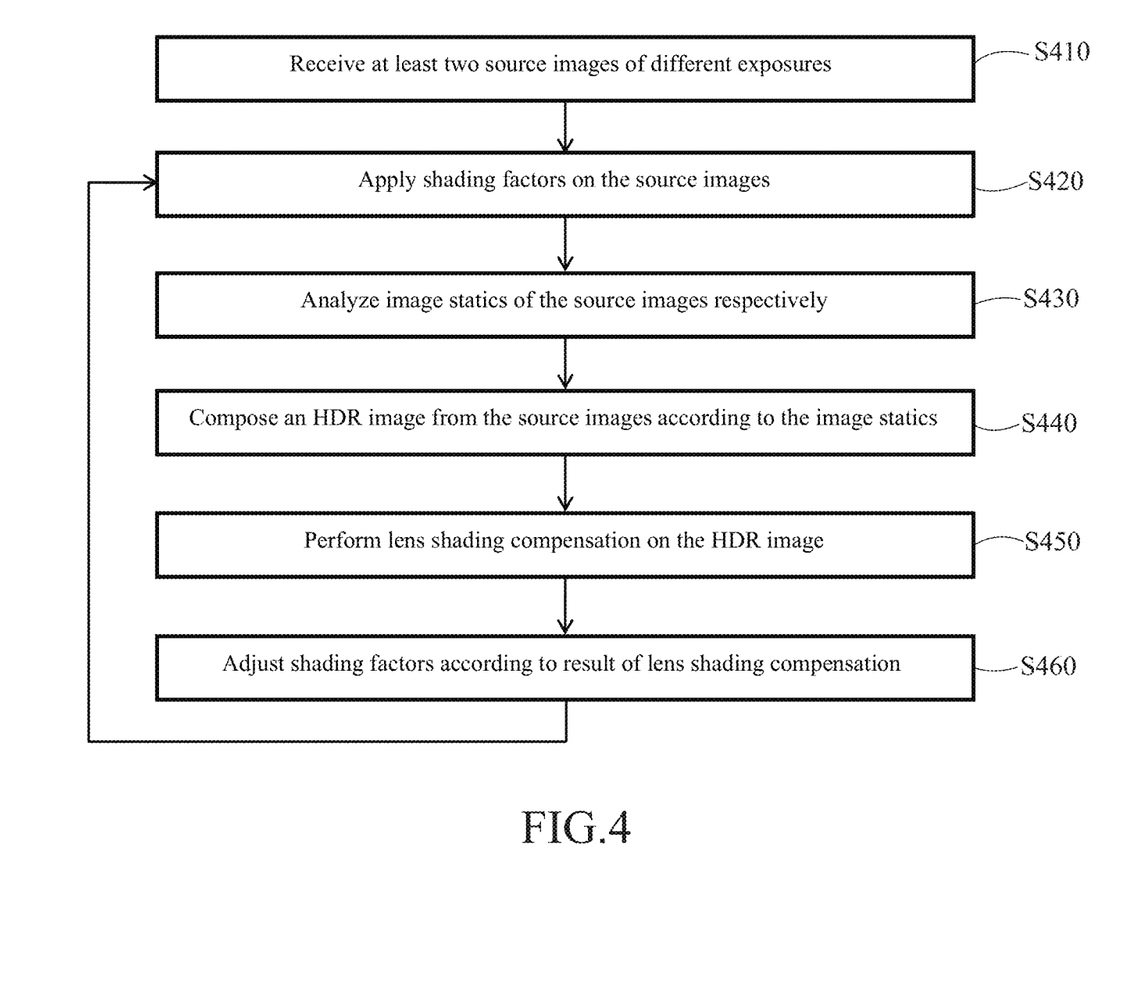
FIG. 4 is a flow chart of a further embodiment of a lens shading compensation method of the present invention.

Please note that in another embodiment of the present disclosure, the result of the second lens shading compensation on the composite HDR image can be feedback to adjust the shading compensation levels of the source images. FIG. 4 illustrates the embodiment of utilizing result of the second lens shading compensation as shading factors of the first lens shading compensation. The method of FIG. 4 can be implemented in an image processing system 100 of FIG. 1 and be executed by the processing units 120/130 of the image processing system 100. At least two source images of different exposure settings are captured and received in S410. The exposure setting comprises at least exposure time and exposure gain. The source images can be provides by different image sources and be processed by different image data paths of the image processing system. Please note here that the image sources and the image data paths need not be physically separated hardware components or circuits. The source images are first processed by applying shading factors on the color channels in S420. For each of the color channels, the shading factors are set according to the pixel positions in the source images. Pixels at the edges or corners of the source images would have stronger compensation than pixels at the center or interior regions of the source images. The compensated source images are then analyzed to obtain corresponding image statics in S430, including but not limited to exposure, sharpness, focus state, and luminance histogram, etc. The luminance histograms of the compensated source images are used in the next step S440 for composing an HDR image. The HDR image is composed by combining partial regions of the compensated source images and/or combining color values of corresponding pixels in the compensated source images. That is, for a given pixel position in the composite HDR image, its pixel value may be derived from any combination of pixel values at the same pixel positions in the compensated source images. The pixel value may be selected from one of the compensated source images or weighted average of the compensated source images. Last, the composite HDR image undergoes another lens shading compensation in S450, which may be implemented by suitable filters and/or algorithm. As said, the color values of the pixels might be contributed from different combination of the source images. The desired shading compensation of the color channels might be changed during the HDR composition. Therefore the composite HDR image is performed with lens shading compensation to achieve desired color distribution. The result of the lens shading compensation could be used for adjusting shading factors applied to the source images in S460. The shading factors may be adjusted according to the adjustment of pixel values with respect to different locations on each color channel and difference among color channels. Different from the embodiment of FIG. 3, the shading factors are first initialized according to the lens hardware and adjusted by the result of the lens shading compensation on the composite HDR image in S450. In an embodiment of the invention, the shading factors may not be adjusted in response to the lens shading compensation does not result in variance of pixel values above predetermined thresholds, the thresholds may be different for different color channel and different pixel location. In another embodiment of the invention, the adjustment of the shading factors may be in proportional to the result of the lens shading compensation.

Figure 5:
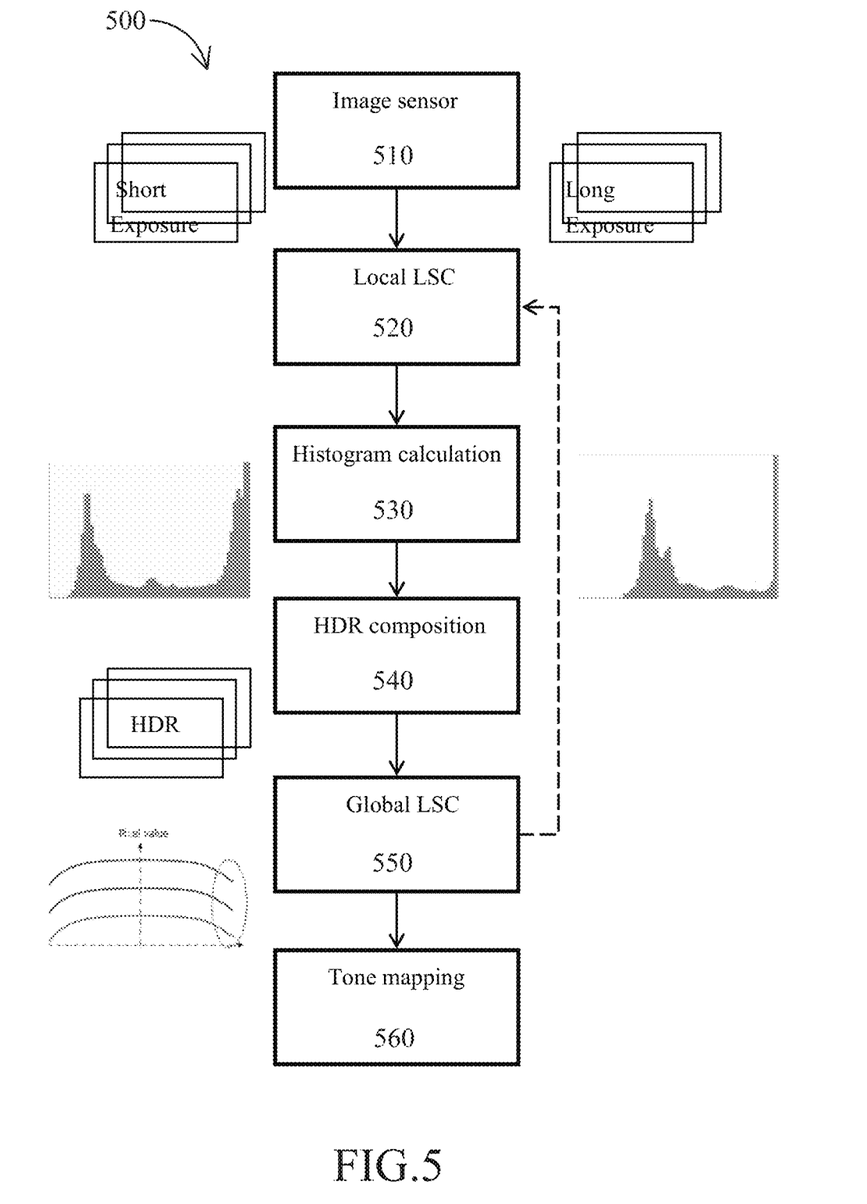
FIG. 5 is a schematic diagram of another embodiment of an image processing system of the present invention.

FIG. 5 illustrates another embodiment of an image processing system 500 capable to perform lens shading compensation. The image processing system 500 may be a portable electronic device, such as mobile phone, tablet, digital camera/camcorder, game console and/or other suitable devices. The image processing system 500 is capable to perform camera shooting and video recording in HDR mode. That is, the image processing system 500 is capable to display and store a series of HDR images continuously in real time. The image processing system 500 comprises, at least, an image sensor module 510, a local lens shading compensation (LSC) module 520, a histogram calculation module 530, an HDR composition module 540, a global LSC module 550 and a tone mapping module 560. Please note that modules within the image processing system 500 can be implemented in either hardware, firmware or software, or combination of above. The image sensor module 510 is configured to capture and provide at least two series of images with different exposure values. In the example of FIG. 5, the image sensor module 510 provides two series of images: long exposure images and short exposure images, in which long exposure images have larger exposure value than the short exposure images. The image sensor module 510 can provide the images via separate output paths or integrated along a single path. For example, long exposure images and short exposure images are provided in interleave, or an output image is formed by interlacing long exposure lines and short exposure lines. In the latter case, the long exposure image and short exposure image are restored by splitting the long exposure lines and short exposure lines. Regardless of the actual generation of the images, the long exposure images and the short exposure images can be provided on different data paths and be processed in parallel. The data paths may go through various modules of the image processing system 500, for example image sensor module 510, local LSC module 520, histogram calculation module 530, etc.

Here in the embodiment of FIG. 5, the local LSC module 520 performs a local LSC on the short exposure images and the long exposure images respectively. The local LSC module 520 may apply proper shading factors or filters/algorithms to adjust the pixel values of the red, green and blue channels. LSC is aimed to reduce relative illumination attenuation of individual channel and level difference between color channels. As can be seen in FIG. 5, a desired distribution of the color channels should have smooth illumination attenuation and similar shape between color levels. This can be achieved by applying proper gains and/or coefficients on the pixel values of each color channel according to pixel position and level difference among color channels. A first processing may be applied to fix the illumination attenuation and a second processing may be applied to adjust level difference among color channels. The local compensated long exposure images and short exposure images are then sent to the histogram calculation module 530 for determining distribution of designated image characteristics. In the embodiment of FIG. 5, the histogram calculation module 530 determines luminance distribution of the local compensated images. Please note that a region of interest (RoI) may be predetermined by system or user, and only the pixels within the RoI are calculated. The size and location of the RoI may be fixed or programmable.

According to the information of luminance distribution, the HDR composition module 540 generates HDR images by combing pixels of the long exposure images and short exposure images. For example, some portions of the HDR image may come from the long exposure image and some from the short exposure image, meanwhile some other portions may be integrating pixels of both images. HDR composition is well known in the art, and thus would be omitted here for simplicity. The composite HDR image is transmitted to the global LSC module 550 for performing a second compensation. The global LSC module 550 performs processing similar to the local LSC module and adjusts color channels of the composite HDR image. In an embodiment of the invention, the local LSC 520 module may receive compensation results of the global LSC module 550 for use as local shading factor. The local LSC module 520 applies the local shading factors to the long exposure images and short images to achieve the first shading compensation. In this embodiment, the local LSC module 520 may be a fast processing without actual analyzing the color channels of the images. Instead, the full processing is done by the global LSC module 550, which may comprise suitable filters and/or algorithms. Filters and/or algorithms for performing LSC may be selected from grid compensation, Bowler filter, etc. The compensated HDR image is then transmitted to the tone mapping unit 560 for smoothing contrast of the compensated HDR image. In an embodiment of the invention, the tone mapping unit 560 maps input pixel values to output pixel values according to a mapping curve. The mapping cure may be predetermined or user defined.

Please note that in the embodiment of FIG. 5, the local LSC module 520, histogram calculation module 530, HDR composition module 540, global LSC module 550 and tone mapping module 560 all perform processing in raw image domain and may be implemented in a dedicated processor, such as the pre-processing unit 120 of FIG. 1. Also in embodiments of the invention, modules of FIG. 5 may be implemented as hardware, software or their combination.

Figure 6:
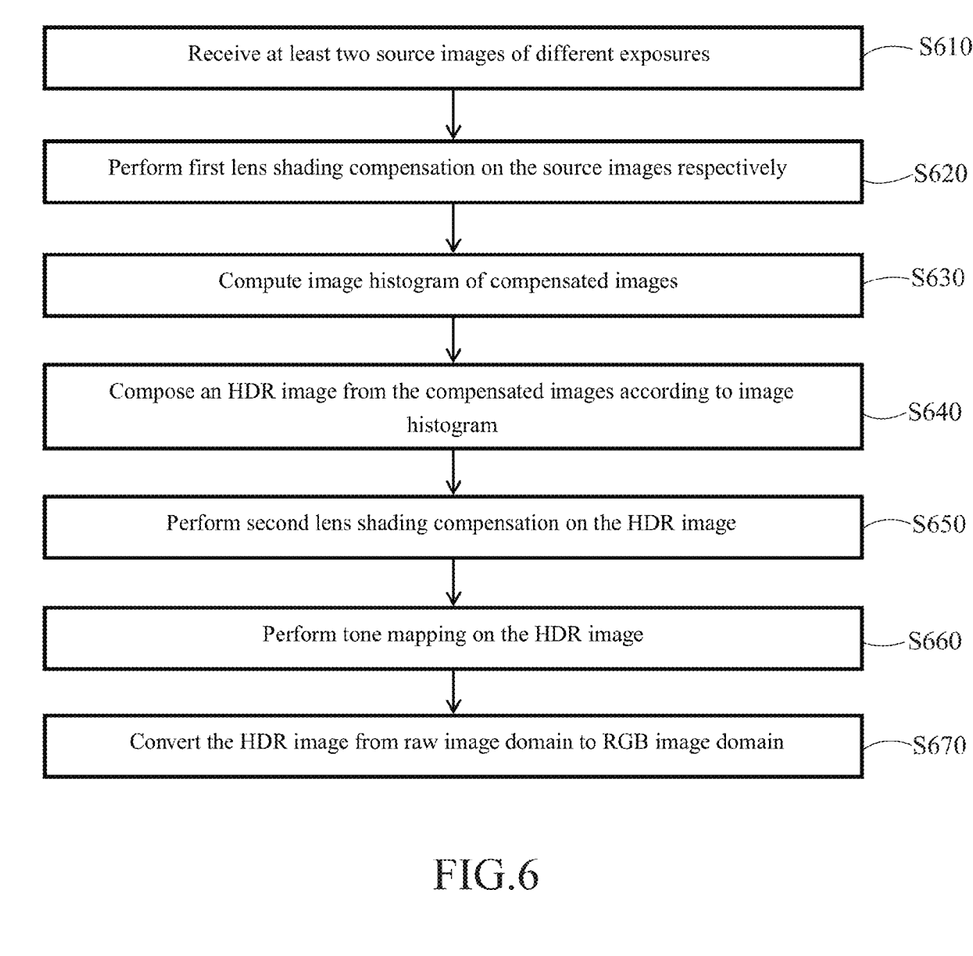
FIG. 6 is a flow chart of a further other embodiment of a lens shading compensation method of the present invention.

FIG. 6 illustrates an embodiment of lens shading compensation method for HDR composition of the present disclosure. The method of FIG. 6 may be implemented by the image processing system 500 of FIG. 5. The method starts by receiving at least two source images of different exposures from an image sensor module (S610). Each of the source images has different exposure value and the source images are provided in parallel on separate data paths in raw image domain. Then a first lens shading compensation (LSC) is performed on the source images respectively in S620. The first LSC may be performed by applying shading factors on the source images or applying suitable filters or algorithms. The compensation level may vary depending on color channel variance and positions of the pixels in the images. Then image histogram of the compensated source images are computed respectively in S630. The image histogram provides information of the luminance/brightness distribution of the compensated source images. By the image histograms of the source images, an HDR image is composed from the compensated source images in S640. The HDR image comprises portions of the source images and/or combination of partial pixels. A second LSC is perform on the compensated HDR image to adjust the color channels in S650 and may adopt similar process used for compensating the source images. Furthermore, the first LSC in S620 may reference compensation results of the second LSC in S650 for determining its shading factors. After the second LSC, tone mapping is performed on the compensated HDR image to further adjust color values of the pixels in S660. Once completing processing in raw mage domain, the final HDR image is converted from raw image domain to RGB image domain for display, editing and/or storage in S670.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims. The above disclosure is related to the detailed technical contents and inventive features thereof.

What is claimed is:

1. A method for performing lens shading compensation, comprising:
   receiving at least two series of source images of different exposure settings;
   performing first lens shading compensation on the at least two series of source images respectively;
   analyzing luminance distribution of the at least two series of compensated source images;
   composing a series of HDR images from the at least two series of compensated source images according to the luminance distribution;
   performing second lens shading compensation on the series of HDR image; and
   performing tone mapping on the series of compensated HDR images;
   wherein the first lens shading compensation is performed by applying shading factors to the at least two series of source images, and result of the second lens shading compensation is fed back to adjust at least one of the shading factors of the first lens shading compensation;
   wherein each of the first and second tens shading compensations is performed according to pixel positions and variance between color channels.

2. The method of claim 1, wherein the shading factors are different for each of the color channels.

3. The method of claim 1, wherein the step of analyzing luminance distribution further comprises:
   determining an region of interest; and
analyzing luminance distribution of the region of interest of the at least two series of compensated source images.

4. The method of claim 1, wherein the at least two series of images are received, analyzed and performed with the first lens shading compensation concurrently in parallel.

5. The method of claim 1, wherein the method is implemented in a processing unit dedicated to perform processing in raw image domain and the series of HDR images are provided as a video sequence.

6. An image processing system, comprising:
   a local lens shading compensation module configured to perform local lens shading compensation on at least two source images of different exposure settings;
   an image analysis module, configured to receive the at least two compensated source images and compute image statics of the at least two compensated source images in parallel;
   an HDR composition module, configured to generate an HDR image from the at least two compensated source images according to the image statics; and
   a lens shading compensation module, configured to perform lens shading compensation on the HDR image;
   wherein the at least two source images and the HDR image are processed in raw image domain, and wherein the local lens shading compensation module is further configured to feed back compensation result of the HDR image by the lens shading compensation module to adjust compensation level of the at least two source images;
   wherein each of the local lens shading compensation and the local lens shading compensation on the HDR image is performed according to pixel positions and variance between color channels.

7. The image processing system of claim 6, further comprising a tone mapping module configured to perform tone mapping on the compensated HDR image.

8. The image processing system of claim 6, further comprising:
   an image input module, configured to provide the at least two source images with different exposure settings concurrently;
   a post-processing module, configured to convert the compensated HDR image from raw image format to RGB image format; and
   a display unit, configured to display the converted HDR image.

9. The image processing system of claim 8, wherein the image analysis module, the HDR composition module and the lens shading compensation module are implemented in a first processing unit dedicated to perform processing in raw image domain, and the post-processing module is implemented in a second processing unit configured to perform processing in other image domain.

10. The image processing system of claim 6, wherein the local lens shading compensation module is configured to perform the local lens shading compensation on at least one of the color channels of the at least two source images.

11. The image processing system of claim 6, wherein the image analysis module, the HDR composition module and the lens shading compensation module are implemented in a processing unit dedicated to perform processing in raw image domain.

12. A method for performing lens shading compensation, comprising:
   receiving at least two source images of different exposure settings;
   performing local lens shading compensation on the at least two source images respectively;
   analyzing image statics of the at least two compensated source images;
   composing at least an HDR image from the at least two compensated source images according to the image statics; and
   performing lens shading compensation on the HDR image;
   wherein the steps of analyzing image statics, composing the HDR image and performing lens shading compensation are executed in raw image domain, and wherein result of the lens shading compensation on HDR image is fed back to adjust compensation level of the local lens shading compensation;
   wherein each of the local lens shading compensation and the lens shading compensation on the HDR image is performed according to pixel positions and variance between color channels.

13. The method of claim 12, further comprising:
   performing tone mapping on the compensated HDR image; and converting the compensated HDR image from raw image domain to RGB image domain.

14. The method of claim 12, wherein the at least two source images are retrieved from at least a first series of images of a first exposure setting and a second series of images of a second exposure setting captured concurrently in real time, and the HDR image is part of a video sequence and composed in real time.

15. The method of claim 14, further comprising:
adjusting the first exposure setting and the second exposure setting according to luminance distribution of the compensated HDR image.

16. The method of claim 12, wherein the step of performing lens shading compensation further comprises:
applying different compensation levels to the color channels of the HDR image
wherein the compensation levels are determined according to the pixel positions and differences between the color channels.

* * * * *